US012705255B2

(12) United States Patent
Sajid et al.

(10) Patent No.: US 12,705,255 B2
(45) Date of Patent: Aug. 11, 2026

(54) SYSTEMS AND METHODS FOR GROUPING EMBEDDING VECTORS IN A STORAGE DEVICE FOR IMPROVED READ LATENCY

(71) Applicant: Samsung Electronics Co., Ltd., Suwon-si (KR)

(72) Inventors: Usman Sajid, Lawrence, KS (US); Sai Prahladh Padmanabhan, San Jose, CA (US); Marie Mai Nguyen, Pittsburgh, PA (US); Rekha Pitchumani, Oak Hill, VA (US); Yang Seok Ki, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/497,250

(22) Filed: Oct. 30, 2023

(65) Prior Publication Data

US 2025/0068649 A1 Feb. 27, 2025

Related U.S. Application Data

(60) Provisional application No. 63/534,445, filed on Aug. 24, 2023.

(51) Int. Cl.

*G06F 16/28* (2019.01)
*G06F 16/245* (2019.01)
*G06F 16/2455* (2019.01)

(52) U.S. Cl.

CPC ...... *G06F 16/285* (2019.01); *G06F 16/24552* (2019.01); *G06F 16/24569* (2019.01)

(58) Field of Classification Search

CPC ............. G06F 16/285; G06F 16/24569; G06F 16/24552

See application file for complete search history.

(56) References Cited

U.S. PATENT DOCUMENTS

| | | | | |
|---|---|---|---|---|
| 11,030,997 | B2 | 6/2021 | Li et al. | |
| 11,238,339 | B2 | 2/2022 | Powell et al. | |
| 11,947,590 | B1 * | 4/2024 | Chakraborty | G06F 16/532 |
| 2014/0095778 | A1 * | 4/2014 | Chung | G06F 9/4552 711/E12.001 |
| 2016/0246723 | A1 * | 8/2016 | Doshi | G06F 9/30036 |

(Continued)

OTHER PUBLICATIONS

Wan, Hu, et al., "FlashEmbedding: Storing Embedding Tables in SSD for Large-Scale Recommender Systems," Proceedings of the 12th ACM SIGOPS Asia-Pacific Workshop on Systems, Aug. 2021, pp. 9-16.

*Primary Examiner* — Kannan Shanmugasundaram

(74) *Attorney, Agent, or Firm* — Womble Bond Dickinson (US) LLP

(57) ABSTRACT

A method of grouping embedding vectors in a storage device includes receiving, at a storage device, an inference query request including a first access index associated with a first embedding vector, determining, with a classification model, a first classification of the first access index, based on the first classification, searching for the first embedding vector in a cache of the storage device, receiving, at the storage device, a second access index associated with a second embedding vector, determining, with the classification model, a second classification of the second access index, and based on the second classification, searching for the second embedding vector in a persistent storage of the storage device.

20 Claims, 6 Drawing Sheets

(56) References Cited

U.S. PATENT DOCUMENTS

| | | | |
|---|---|---|---|
| 2019/0236167 | A1 | 8/2019 | Hu et al. |
| 2021/0174163 | A1* | 6/2021 | Verma .................. G06F 16/953 |
| 2021/0397610 | A1 | 12/2021 | Singh et al. |
| 2022/0107828 | A1 | 4/2022 | Mostafa |
| 2023/0070874 | A1 | 3/2023 | Feng et al. |
| 2023/0105019 | A1* | 4/2023 | Ghosh .................. G06Q 10/083 705/28 |

* cited by examiner

Figure 1:
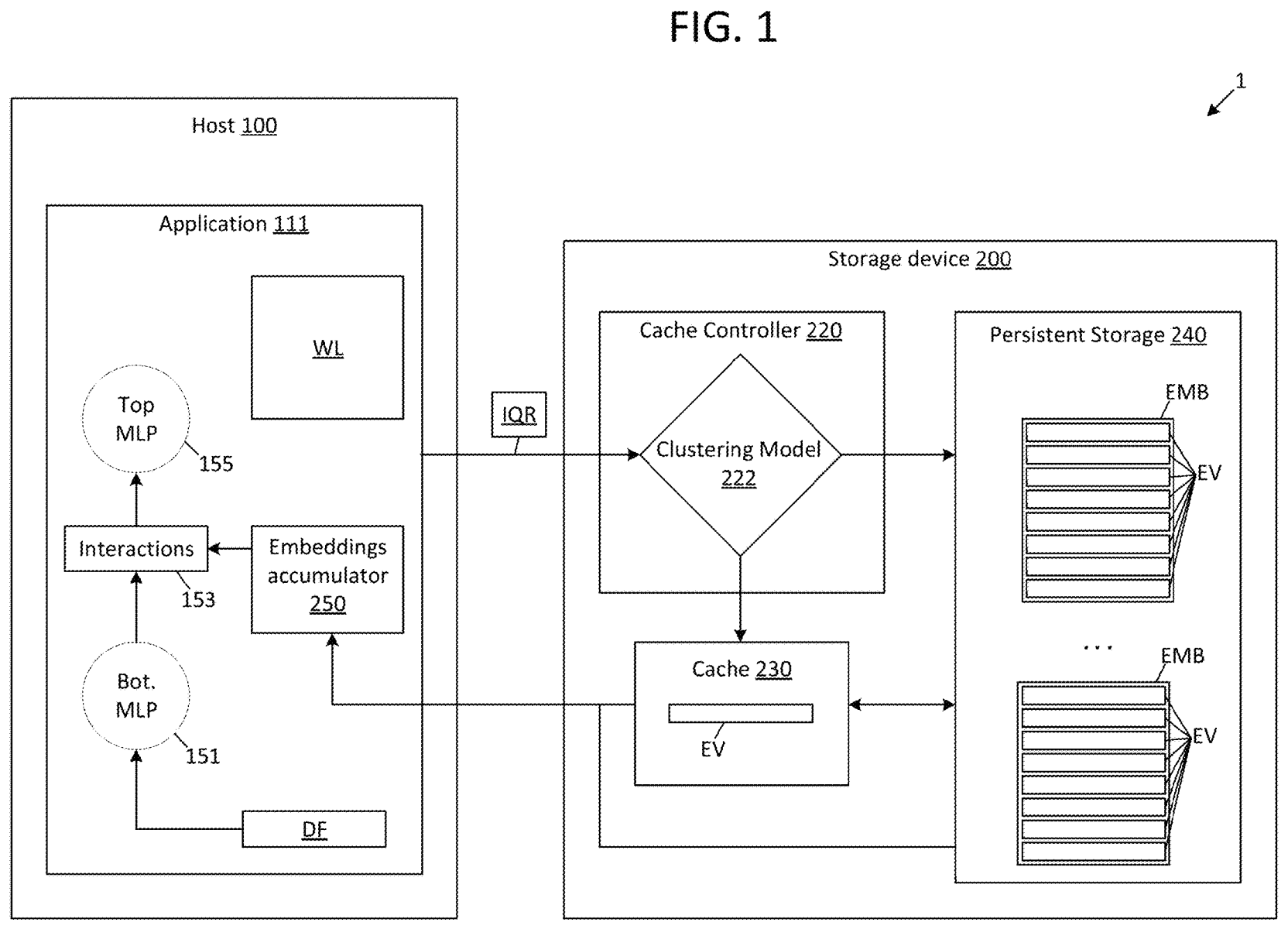

Storage device 200

Persistent Storage 240

EMB

EV

Cache Controller 220

Clustering Model 222

Cache 230

EV

IQR

Host 100

Application 111

WL

Embeddings accumulator 250

DF

Top MLP

155

Interactions

153

Bot. MLP

151

EMB
EMBS
Embedding table size
SFS
Sparse feature size
EV
EV
EV
EV
EV
EV
EV
IQR
NIL
Number of indices per lookup
BS
Batch size
10
10
20
20
10
10
Mini-batch
MB
Mini-batch size
MBS

FIG. 3

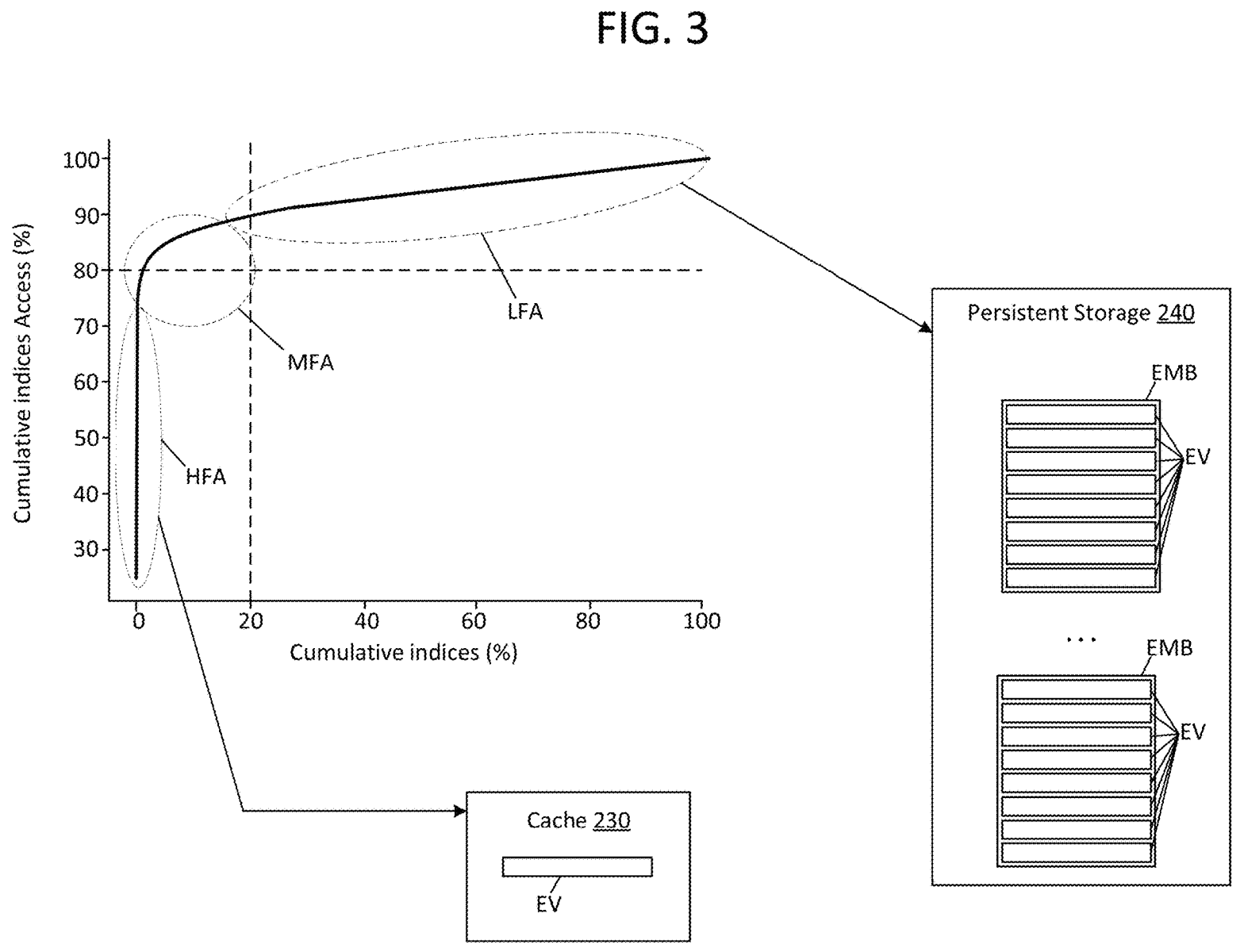

Persistent Storage 240

EMB

EV

EMB

EV

...

LFA

MFA

HFA

Cumulative indices Access (%)

100 90 80 70 60 50 40 30

0 20 40 60 80 100

Cumulative indices (%)

Cache 230

EV

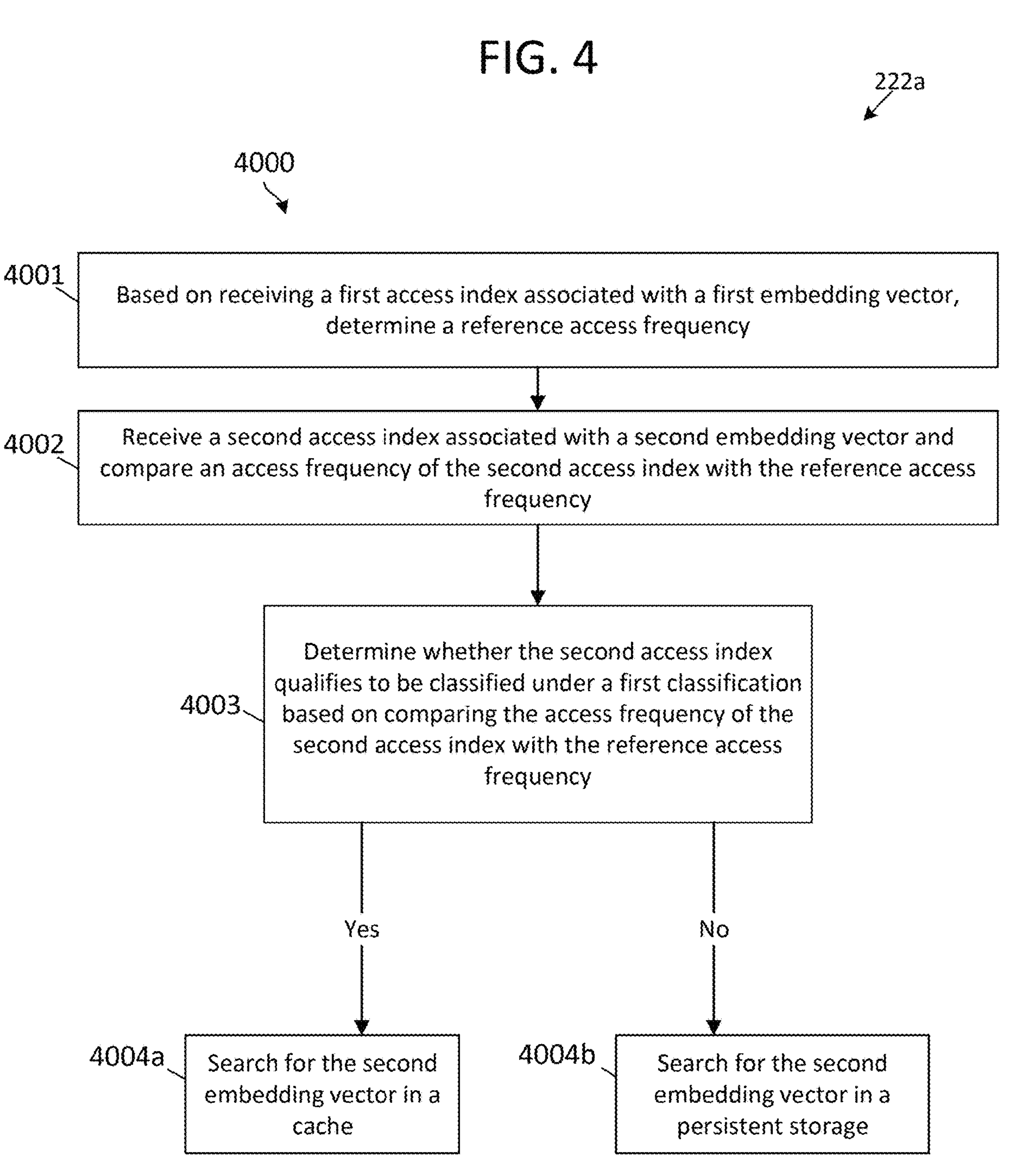
FIG. 4
222a
4000
4001
Based on receiving a first access index associated with a first embedding vector, determine a reference access frequency
4002
Receive a second access index associated with a second embedding vector and compare an access frequency of the second access index with the reference access frequency
4003
Determine whether the second access index qualifies to be classified under a first classification based on comparing the access frequency of the second access index with the reference access frequency
Yes
No
4004a
Search for the second embedding vector in a cache
4004b
Search for the second embedding vector in a persistent storage

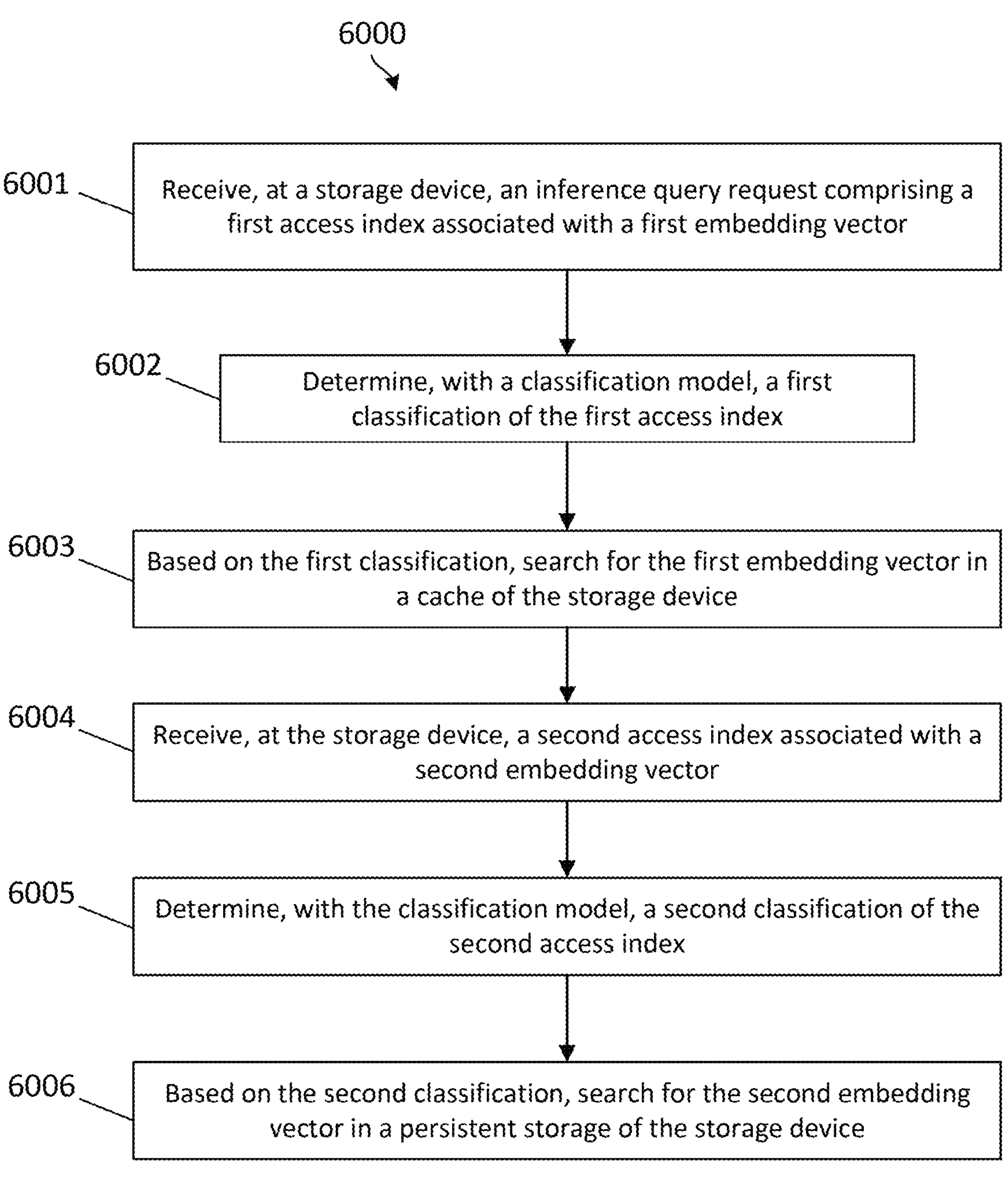
FIG. 6
6000
6001
Receive, at a storage device, an inference query request comprising a first access index associated with a first embedding vector
6002
Determine, with a classification model, a first classification of the first access index
6003
Based on the first classification, search for the first embedding vector in a cache of the storage device
6004
Receive, at the storage device, a second access index associated with a second embedding vector
6005
Determine, with the classification model, a second classification of the second access index
6006
Based on the second classification, search for the second embedding vector in a persistent storage of the storage device

SYSTEMS AND METHODS FOR GROUPING EMBEDDING VECTORS IN A STORAGE DEVICE FOR IMPROVED READ LATENCY

CROSS-REFERENCE TO RELATED APPLICATION(S)

This application claims priority to, and benefit of, U.S. Provisional Application Ser. No. 63/534,445, filed on Aug. 24, 2023, entitled "REDUCING EMBEDDING TABLES READ LATENCY IN DLRM INFERENCE VIA GROUPING/CLUSTERING METHODOLOGY AND LEVERAGING COMPUTE EXPRESS LINK (CXL) SSD," the entire content of which is incorporated herein by reference.

FIELD

Aspects of some embodiments according to the present disclosure relate to systems and methods for grouping embedding vectors in a storage device for improved read latency.

BACKGROUND

In the field of computer storage, a system may include a host and one or more storage device connected to (e.g., communicably coupled to) the host. Such computer storage systems have become increasingly popular, in part, for allowing many different users to share the computing resources of the system. Storage requirements have increased over time as the number of users of such systems and the number and complexity of applications running on such systems have increased.

Accordingly, there may be a need for methods, systems, and devices that are suitable for improving the use of storage devices in storage systems.

The present background section is intended to provide context only, and the disclosure of any embodiment or concept in this section does not constitute an admission that said embodiment or concept is prior art.

SUMMARY

Aspects of some embodiments of the present disclosure relate to computer storage systems, and provide improvements to machine learning (ML).

According to some embodiments of the present disclosure, there is provided a method including receiving, at a storage device, an inference query request including a first access index associated with a first embedding vector, determining, with a classification model, a first classification of the first access index, based on the first classification, searching for the first embedding vector in a cache of the storage device, receiving, at the storage device, a second access index associated with a second embedding vector, determining, with the classification model, a second classification of the second access index, and based on the second classification, searching for the second embedding vector in a persistent storage of the storage device.

The first classification may indicate a first access frequency, and the second classification may indicate a second access frequency that is less than the first access frequency.

The determining the first classification may include comparing an access frequency associated with the first access index with a reference access frequency, and the determining the second classification may include comparing an access frequency associated with the second access index with the reference access frequency.

The determining the first classification may include generating an output from a machine-learning (ML) grouping model based on the first access index.

The determining the second classification may include generating an output from the machine-learning (ML) grouping model based on the second access index.

The storage device may be configured to communicate with a host via a cache coherent protocol.

The second embedding vector may be prevented from being stored in the cache of the storage device based on a reference access frequency.

According to some other embodiments of the present disclosure, there is provided a storage device including a cache memory, and a persistent memory, wherein, the storage device is configured to receive an inference query request including a first access index associated with a first embedding vector, determine, with a classification model, a first classification of the first access index, based on the first classification, search for the first embedding vector in the cache memory, receive a second access index associated with a second embedding vector, determine, with the classification model, a second classification of the second access index, and based on the second classification, search for the second embedding vector in the persistent memory.

The first classification may indicate a first access frequency, and the second classification may indicate a second access frequency that is less than the first access frequency.

The determining the first classification may include comparing an access frequency associated with the first access index with a reference access frequency, and the determining the second classification may include comparing an access frequency associated with the second access index with the reference access frequency.

The determining the first classification may include generating an output from a machine-learning (ML) grouping model based on the first access index.

The determining the second classification may include generating an output from the machine-learning (ML) grouping model based on the second access index.

The storage device may be configured to communicate with a host via a cache coherent protocol.

The second embedding vector may be prevented from being stored in the cache memory based on a reference access frequency.

According to some other embodiments of the present disclosure, there is provided a system, including a processor, and a memory storing instructions, which, when executed by the processor, cause the processor to perform receiving an inference query request including a first access index associated with a first embedding vector, determining, with a classification model, a first classification of the first access index, based on the first classification, searching for the first embedding vector in a cache of a storage device, receiving a second access index associated with a second embedding vector, determining, with the classification model, a second classification of the second access index, and based on the second classification, searching for the second embedding vector in a persistent storage of the storage device.

The first classification may indicate a first access frequency, and the second classification may indicate a second access frequency that is less than the first access frequency.

The determining the first classification may include comparing an access frequency associated with the first access index with a reference access frequency, and the determining the second classification may include comparing an access frequency associated with the second access index with the reference access frequency.

The determining the first classification may include generating an output from a machine-learning (ML) grouping model based on the first access index.

The determining the second classification may include generating an output from the machine-learning (ML) grouping model based on the second access index.

The second embedding vector may be prevented from being stored in the cache of the storage device based on a reference access frequency.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 1 is a system diagram depicting a system for grouping embedding vectors in a storage device, according to some embodiments of the present disclosure.

FIG. 3 is a diagram depicting a Pareto distribution in a temporal locality graph for access indices, according to some embodiments of the present disclosure.

FIG. 4 is a flowchart depicting a method of classifying access indices using a reference-frequency clustering model, according to some embodiments of the present disclosure.

FIG. 6 is a flowchart depicting a method of grouping embedding vectors in a storage device, according to some embodiments of the present disclosure.

Figure 2:
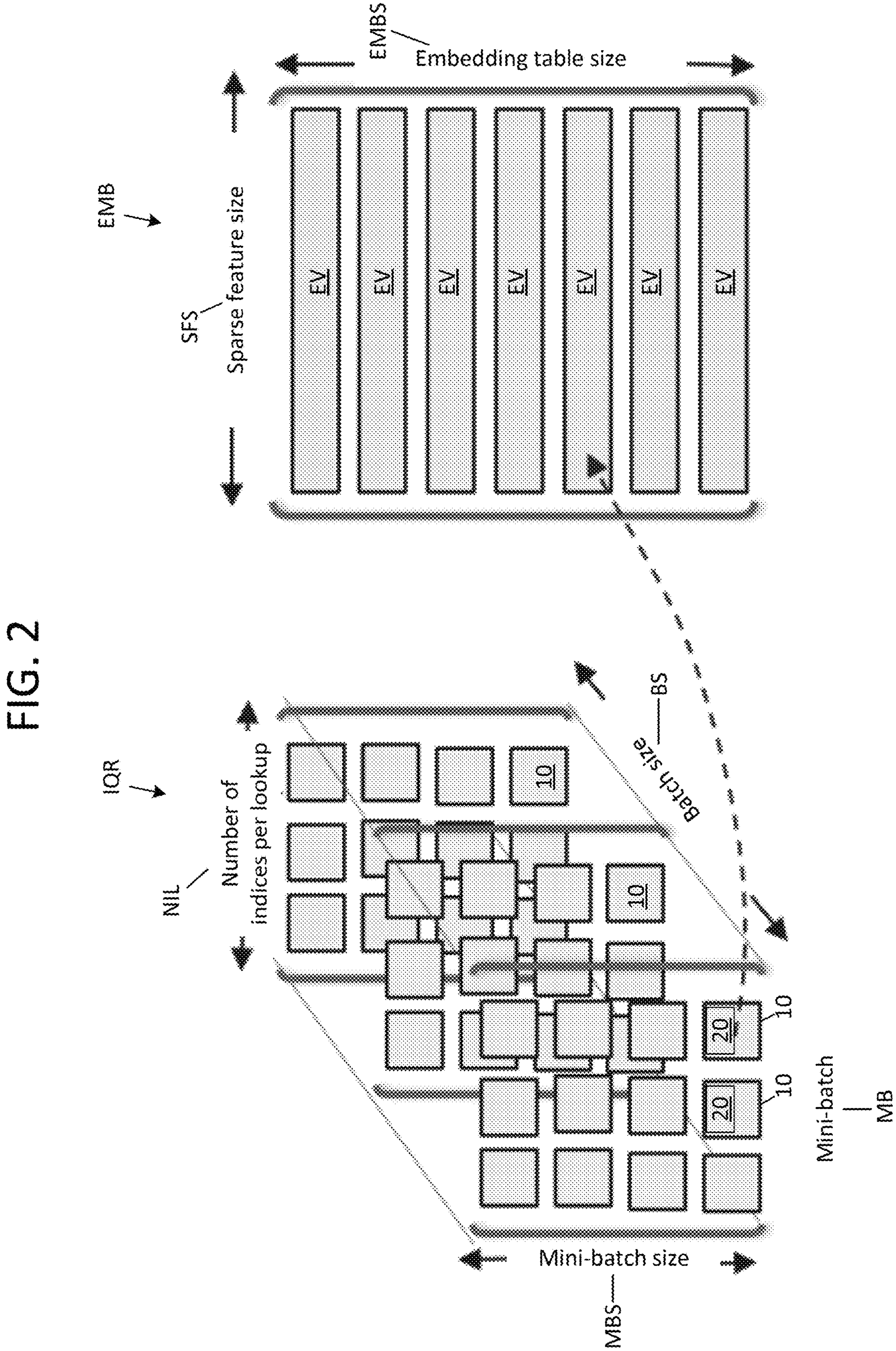
FIG. 2 is a diagram depicting an inference query request (IQR) and an embedding table, according to some embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown to facilitate a less obstructed view of these various embodiments and to make the description clear.

DETAILED DESCRIPTION

Aspects of the present disclosure and methods of accomplishing the same may be understood more readily by reference to the detailed description of one or more embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey aspects of the present disclosure to those skilled in the art. Accordingly, description of processes, elements, and techniques that are not necessary to those having ordinary skill in the art for a complete understanding of the aspects and features of the present disclosure may be omitted.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or component is referred to as being "on," "connected to," or "coupled to" another element or component, it can be directly on, connected to, or coupled to the other element or component, or one or more intervening elements or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or component is referred to as being "between" two elements or components, it can be the only element or component between the two elements or components, or one or more intervening elements or components may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, each of the terms "or" and "and/or" includes any and all combinations of one or more of the associated listed items.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Any of the components or any combination of the components described (e.g., in any system diagrams included herein) may be used to perform one or more of the operations of any flow chart included herein. Further, (i) the operations are merely examples, and may involve various additional operations not explicitly covered, and (ii) the temporal order of the operations may be varied.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, in the field of computer storage, a system may include a host and one or more storage devices (e.g., solid-state drives SSDs) communicably coupled to the host. The system may be used to process a machine-learning workload (e.g., an inference workload). For example, the machine-learning workload may be a deep-learning recommender-model (DLRM) inference workload, including many (e.g., billions of) embedding vectors (EV). An "embedding vector," as used herein, refers to a data structure used in machine learning to provide a numerical representation of an object for processing by a neural network (e.g., a multi-layer perceptron (MLP)). Embedding vectors may be categorized into different embedding tables (EMBs), which take up large amounts of space in memory (e.g., in persistent memory). Embedding vectors may be requested for processing as part of an inference workload by way of inference query requests. An "inference query request," as used herein, refers to a request including an access index corresponding to a specific embedding vector. An inference query request may cause a batch of embedding vectors to be extracted from memory by using access indices, each access index being used to locate a respective embedding vector. Persistent memory (also referred to as non-volatile memory, such as a NAND flash memory and/or the like) may be considered to be a relatively slow form of memory compared to volatile memory types used for cache memory (e.g., random-access memory (RAM)). Accordingly, retrieving embedding vectors only from a persistent memory may cause increased latency, which may slow down the processing of inference workloads.

To reduce latencies in a flexible manner, aspects of embodiments of the present disclosure provide improvements to such systems by grouping embedding vectors in a fast memory (e.g., cache memory) and a slow memory (e.g., persistent storage) based on using a clustering model (also referred to as a grouping model or a classification model) and leveraging a Pareto distribution for access indices to exclude less frequently-accessed embedding vectors from the fast memory. In some embodiments, the clustering model may be a reference-frequency grouping model. In some embodiments, the clustering model may be a ML grouping model.

FIG. 1 is a system diagram depicting a system for grouping embedding vectors in a storage device, according to some embodiments of the present disclosure.

Referring to FIG. 1, a system 1 may include a host 100 communicably coupled with a storage device 200. In some embodiments, the host 100 may be communicably coupled with the storage device 200 via a cache-coherent protocol, such as Compute Express Link (CXL) and/or the like. For example, the storage device 200 may be a CXL solid-state drive (SSD). The storage device 200 may include a cache 230 (e.g., a cache memory) and a persistent storage 240. As discussed above, a memory type of the cache 230 may be a faster memory type (e.g., a dynamic random-access memory (DRAM) cache) than a memory type of the persistent storage (e.g., a NAND flash memory). The storage device 200 may include a cache controller 220 for managing the storage of data within the cache 230 and/or the persistent storage 240. The persistent storage 240 may be used to store embedding vector tables EMB. Each embedding vector table EMB may include embedding vectors EV. The embedding vectors may correspond to sparse features for processing by an application 111 running on the host 100. The application 111 may be a DLRM for processing a workload WL (e.g., an inference workload) on the host 100. The application 111 may include a neural network for processing dense features DF along with the sparse features to generate an inference. The neural network may be a multi-layer perceptron (MLP). The MLP may include a bottom layer 151 and a top layer 155.

To generate an inference based on specific embedding vectors EV, the application 111 may send an inference query request IQR to the storage device 200. The inference query request IQR may include a sub-request 10 (see FIG. 2), which is associated with an embedding vector EV, and includes an access index 20 (see FIG. 2) for locating the corresponding embedding vector EV. The storage device 200 may receive the inference query request IQR at the cache controller 220. The cache controller 220 may include a clustering model 222. The clustering model 222 may determine whether the storage device 200 may search in the cache 230 or the persistent storage 240 for the embedding vector EV. The clustering model 222 may determine a classification of the embedding vector EV associated with the access index 20 based on whether the access index is a frequently accessed index. If the clustering model 222 determines that the access index 20 is frequently accessed, the storage device 200 may search the cache 230 for the embedding vector EV. If the embedding vector EV is in the cache 230, the storage device 200 may send the embedding vector EV to an embeddings accumulator 250 at the host 100. If the embedding vector EV is not in the cache 230, the storage device may search for and retrieve the embedding vector EV from the persistent storage 240 for sending to the embeddings accumulator 250.

On the other hand, if the clustering model 222 determines that the access index 20 is not frequently accessed, the storage device 200 may search for (e.g., directly search for) and retrieve the embedding vector EV from the persistent storage 240 for sending to the embeddings accumulator 250. In some embodiments, the storage device 200 may prevent (e.g., may exclude) embedding vectors EV that are not frequently accessed from being stored in the cache 230. The MLP may process the embedding vectors EV received by the embeddings accumulator 250 with the dense features DF by way of interactions 153 (e.g., products, summations, and/or the like) to generate inferences.

In some embodiments, the clustering model 222 may be a reference-frequency grouping model as discussed below with respect to FIG. 4. In some embodiments, the clustering model 222 may be a ML grouping model as discussed below with respect to FIG. 5.

FIG. 2 is a diagram depicting an inference query request (IQR) and an embedding table, according to some embodiments of the present disclosure.

Referring to FIG. 2, an inference query request IQR may include many sub-requests 10. Each sub-request 10 may include an access index 20 for locating a corresponding embedding vector EV in the corresponding embedding table EMB. The clustering model 222 may process sub-requests 10 one-by-one. Thus, a first received access index 20 and a second received access index 20 may come from the same inference query request IQR or from different inference query requests IQR. Each inference query request IQR may have a given batch size BS. Each inference query request IQR may include multiple mini-batches MB having a given mini-batch size MBS. Each inference query request IQR may be described in terms of a number of indices per lookup NIL. Each embedding table EMB may have a given embedding table size EMBS. Each embedding table EMB may be described in terms of a sparse feature size SFS.

FIG. 3 is a diagram depicting a Pareto distribution in a temporal locality graph for access indices, according to some embodiments of the present disclosure.

Referring to FIG. 3, a DLRM inference workload may exhibit a Pareto distribution, wherein a relatively small percentage of access indices are requested by the workload most of the time. For example, the graph depicted in FIG. 3 shows a non-limiting example where 20 percent of all the access indices (see the vertical dashed line touching the x-axis of the graph) account for over 80 percent of all index access requests (see the horizontal dashed line touching the y-axis of the graph). In some embodiments, the Pareto distribution associated with the access indices of a storage device may serve as a basis for determining whether a given access index is classified as falling within a high-frequency access group HFA or a low-frequency access group LFA. In some embodiments, the access indices classified as falling within the high-frequency access group HFA may be stored in the cache 230. In some embodiments, the access indices classified as falling within the low-frequency access group LFA may be excluded from being stored in the cache 230 and may be stored only in the persistent storage 240. That is, the storage device 200 (see FIG. 1) may prevent access indices classified as falling within the low-frequency access group LFA from being stored in the cache 230. Accordingly, a latency associated with a workload may be improved when compared to storing some indices falling within the low-frequency access group LFA in the cache 230 or storing some indices falling within the high-frequency access group HFA only in the persistent storage 240.

A knee of the Pareto distribution may correspond to a middle-frequency access group MFA, which may include access indices that could be classified with the high-frequency access group HFA or the low-frequency access group LFA depending on specific aspects of an application or a system. For example, if the size of the cache 230 is more limited in a given system, a reference access frequency (e.g., a threshold access frequency) between the high-frequency access group HFA and the low-frequency access group LFA may be chosen to exclude more of the access indices falling within the middle-frequency access group MFA from being stored in the cache 230.

FIG. 4 is a flowchart depicting a method of classifying access indices using a reference-frequency clustering model, according to some embodiments of the present disclosure.

The clustering model **222*a* may classify access indices by developing an understanding of the Pareto distribution based on one or more initial access indices (e.g., one or more sample access indices), and determining (e.g., manually and empirically determining) a reference access frequency (e.g., a threshold access frequency) based on the Pareto distribution. The threshold access frequency may be compared with any given access index to determine whether the access index falls within the high-frequency access group HFA or the low-frequency access group LFA (see FIG. 3**).

A method 4000 of classifying access indices using a reference-frequency clustering model **222*a* may include the following example operations. Based on receiving a first access index 20 associated with a first embedding vector EV, the storage device 200 (see FIGS. 1 and 2) may determine a reference access frequency (operation 4001). The storage device 200 may receive a second access index 20 associated with a second embedding vector EV and compare an access frequency of the second access index 20 with the reference access frequency (operation 4002). The storage device 200**

(e.g., the clustering model 222) may determine whether the second access index 20 qualifies to be classified under a first classification based on the comparison of operation 4002 (operation 4003). If the storage device 200 determines that the second access index 20 qualifies to be classified under the first classification, the storage device 200 may search for the second embedding vector EV in a cache 230 (operation 4004*a*). If the storage device 200 determines that the second access index 20 does not qualify to be classified under the first classification (e.g., qualifies to be classified under a second classification that is different from the first classification), the storage device 200 may search for the second embedding vector EV in the persistent storage 240 (operation 4004*b*). It should be understood that the method 4000 may be performed using any suitable frequency-based clustering model known to one of ordinary skill in the art.

Figure 5:
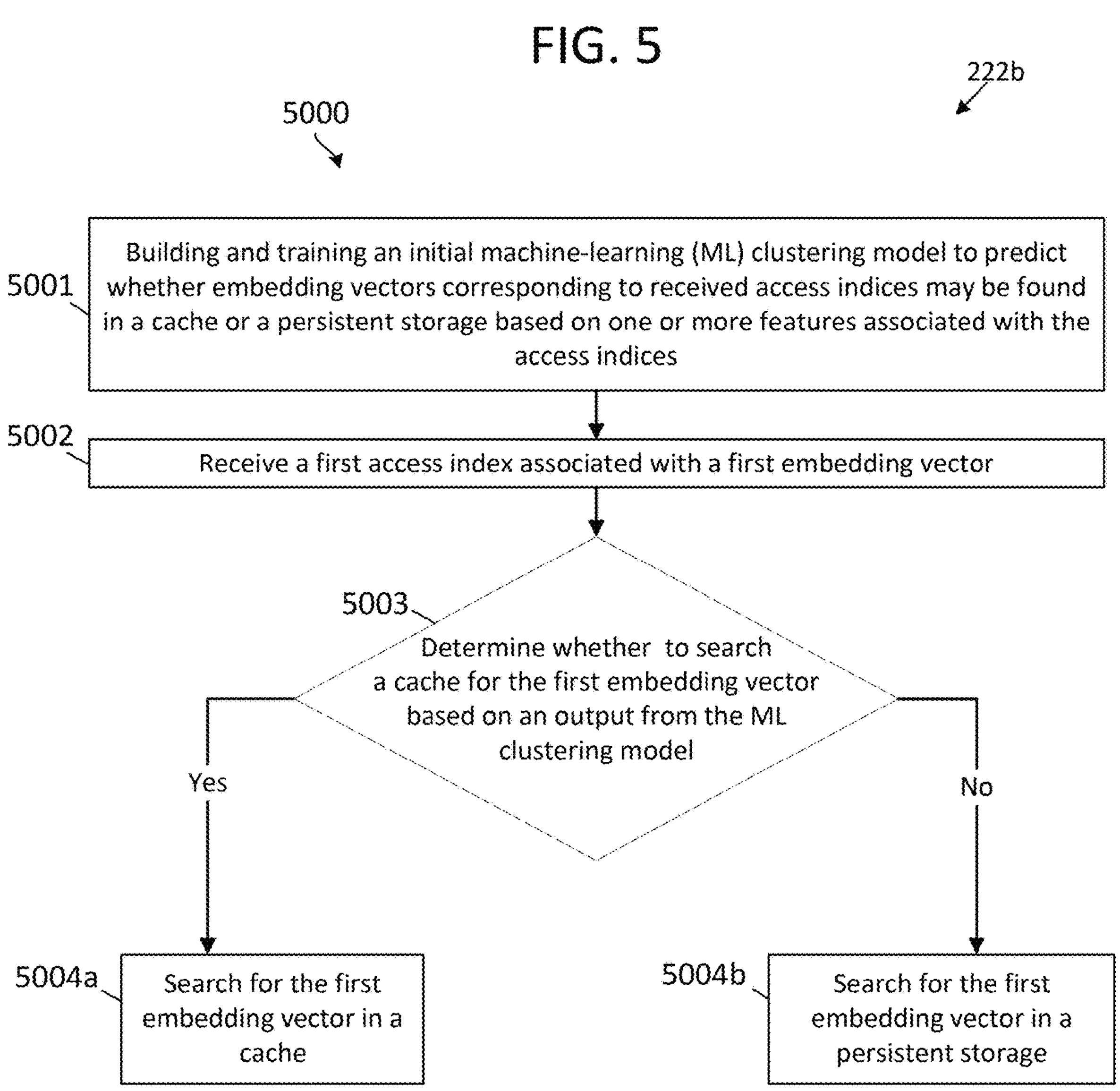
FIG. 5 is a flowchart depicting a method of classifying access indices using a ML clustering model, according to some embodiments of the present disclosure.

FIG. 5 is a flowchart depicting a method of classifying access indices using a ML clustering model, according to some embodiments of the present disclosure.

Referring to FIG. 5, a method 5000 of classifying access indices using a ML clustering model 222*b* may include the following example operations. An initial ML clustering model 222*b* may be built and trained to infer (e.g., estimate or predict) whether embedding vectors corresponding to received access indices may be found (e.g., located) in a cache 230 or a persistent storage 240 (see FIG. 1), based on one or more features associated with the access indices (operation 5001). The storage device 200 may receive a first access index associated with a first embedding vector EV (operation 5002). For example, the storage device 200 may receive the first access index after a cold-start building period associated with the ML clustering model 222*b* (operation 5002). The storage device 200 may determine whether to search the cache 230 for the first embedding vector based on an output generated by the ML clustering model 222*b* (operation 5003). If the output indicates that the first embedding vector EV may be found in the cache 230, the storage device 200 may search for the first embedding vector EV in the cache 230 (operation 5004*a*). If the output indicates that the first embedding vector EV may be found (e.g., may only be found) in the persistent storage 240, the storage device 200 may search for (e.g., may directly search for) the first embedding vector EV in the persistent storage 240, without checking (e.g., bypassing) the cache 230 (operation 5004*b*). It should be understood that the method 5000 may be performed using any suitable ML-based clustering model known to one of ordinary skill in the art.

FIG. 6 is a flowchart depicting a method of grouping embedding vectors in storage, according to some embodiments of the present disclosure.

Referring to FIG. 6, the method 6000 may include the following example operations. A storage device 200 may receive an inference query request IQR including a first access index 20 associated with a first embedding vector EV (operation 6001). The storage device 200 may determine, with a clustering model 222 (e.g., a classification model), a first classification (e.g., high-frequency access) of the first access index 20 (operation 6002). Based on the first classification, the storage device 200 may search for the first embedding vector in a cache 230 (operation 6003). The storage device 200 may receive a second access index 20 associated with a second embedding vector EV (operation 6004). The storage device 200 may determine, with the clustering model 222, a second classification (e.g., low-frequency access) of the second access index (operation 6005). Based on the second classification, the storage device 200 may search for the second embedding vector EV in a persistent storage 240 (operation 6006).

Accordingly, aspects of some embodiments of the present disclosure may provide improvements to data storage by providing systems and methods for grouping embedding vectors in fast memory and slow memory by using a reference-frequency clustering model or a ML grouping model that may be applied flexibly to a variety of storage devices to achieve increased cache hit rates, reduced storage device persistent memory lookups, and reduced overall embedding-vector lookup latency.

Example embodiments of the disclosure may extend to the following statements, without limitation:

Statement 1. An example method includes: receiving, at a storage device, an inference query request including a first access index associated with a first embedding vector, determining, with a classification model, a first classification of the first access index, based on the first classification, searching for the first embedding vector in a cache of the storage device, receiving, at the storage device, a second access index associated with a second embedding vector, determining, with the classification model, a second classification of the second access index, and based on the second classification, searching for the second embedding vector in a persistent storage of the storage device.

Statement 2. An example method includes the method of statement 1, wherein the first classification indicates a first access frequency, and the second classification indicates a second access frequency that is less than the first access frequency.

Statement 3. An example method includes the method of any of statements 1 and 2, wherein the determining the first classification includes comparing an access frequency associated with the first access index with a reference access frequency, and the determining the second classification includes comparing an access frequency associated with the second access index with the reference access frequency.

Statement 4. An example method includes the method of any of statements 1 and 2, wherein the determining the first classification includes generating an output from a machine-learning (ML) grouping model based on the first access index.

Statement 5. An example method includes the method of any of statements 1, 2, and 4, wherein the determining the second classification includes generating an output from the machine-learning (ML) grouping model based on the second access index.

Statement 6. An example method includes the method of any of statements 1-5, wherein the storage device is configured to communicate with a host via a cache coherent protocol.

Statement 7. An example method includes the method of any of statements 1-6, wherein the second embedding vector is prevented from being stored in the cache of the storage device based on a reference access frequency.

Statement 8. An example device for performing the method of any of statements 1-7 includes a storage device including a cache memory, and a persistent memory, wherein the storage device is configured to perform the method of any of statements 1-7.

Statement 9. An example system for performing the method of any of statements 1-7 includes a processor, and a memory storing instructions, which, when executed by the processor, cause the processor to perform the method of any of statements 1-7.

While embodiments of the present disclosure have been particularly shown and described with reference to the embodiments described herein, it will be understood by those of ordinary skill in the art that various changes in form and details may be made therein without departing from the spirit and scope of the present disclosure as set forth in the following claims and their equivalents.

What is claimed is:

1. A method, comprising:

receiving, at a storage device, an inference query request comprising a first access index to locate a first embedding vector, the first embedding vector representing an object for processing by a machine-learning (ML) model;

determining, from a first output of a classification model, a first location of the first embedding vector;

searching for the first embedding vector in the first location;

receiving, at the storage device, a second access index to locate a second embedding vector;

determining, from a second output of the classification model, a second location of the second embedding vector; and searching for the second embedding vector in the second location.

2. The method of claim 1, wherein:

the first output indicates a first access frequency; and the second output indicates a second access frequency that is less than the first access frequency.

3. The method of claim 1, wherein:

the determining, from the first output of the classification model, comprises comparing an access frequency associated with the first access index with a reference access frequency; and the determining, from the second output of the classification model, comprises comparing an access frequency associated with the second access index with the reference access frequency.

4. The method of claim 1, wherein the classification model comprises a machine-learning (ML) grouping model.

5. The method of claim 4, further comprising generating, by the machine-learning (ML) grouping model, the first output based on the first access index.

6. The method of claim 1, wherein the storage device is configured to communicate with a host via a cache coherent protocol.

7. The method of claim 1, wherein the second embedding vector is prevented from being stored in the first location of the storage device based on a reference access frequency.

8. The method of claim 1, wherein:

the first location of the first embedding vector comprises a cache; and the second location of the second embedding vector comprises a persistent storage.

9. A hardware storage device, comprising:

a first location; and a second location, wherein, the hardware storage device is configured to:

receive an inference query request comprising a first access index to locate a first embedding vector, the first embedding vector representing an object for processing by a machine-learning (ML) model;

determine, from a first output of a classification model, to search the first location for the first embedding vector;

search for the first embedding vector in the first location;

receive a second access index to locate a second embedding vector;

determine, from a second output of the classification model, to search the second location for the second embedding vector; and search for the second embedding vector in the second location.

10. The hardware storage device of claim 9, wherein:

the first output indicates a first access frequency; and the second output indicates a second access frequency that is less than the first access frequency.

11. The hardware storage device of claim 9, wherein:

the determining, from the first output of the classification model, comprises comparing an access frequency associated with the first access index with a reference access frequency; and the determining, from the second output of the classification model, comprises comparing an access frequency associated with the second access index with the reference access frequency.

12. The hardware storage device of claim 9, wherein the classification model comprises a machine-learning (ML) grouping model.

13. The hardware storage device of claim 12, wherein the hardware storage device is configured to generate the first output from the machine-learning (ML) grouping model based on the first access index.

14. The hardware storage device of claim 9, wherein the second embedding vector is prevented from being stored in the first location based on a reference access frequency.

15. A system, comprising:

a processor; and a memory storing instructions, which, when executed by the processor, cause the processor to perform:

receiving an inference query request comprising a first access index to locate a first embedding vector, the first embedding vector representing an object for processing by a machine-learning (ML) model;

determining, from a first output of a classification model, a first location of the first embedding vector;

searching for the first embedding vector in the first location;

receiving a second access index to locate a second embedding vector;

determining, from a second output of the classification model, a second location of the second embedding vector; and searching for the second embedding vector in the second location.

16. The system of claim 15, wherein:

the first output indicates a first access frequency; and the second output indicates a second access frequency that is less than the first access frequency.

17. The system of claim 15, wherein:

the determining, from the first output of the classification model, comprises comparing an access frequency associated with the first access index with a reference access frequency; and the determining, from the second output of the classification model, comprises comparing an access frequency associated with the second access index with the reference access frequency.

18. The system of claim 15, wherein the classification model comprises a machine-learning (ML) grouping model.

19. The system of claim 18, wherein the machine-learning (ML) grouping model generates the first output based on the first access index.

20. The system of claim 15, wherein the second embedding vector is prevented from being stored in the first location based on a reference access frequency.

* * * * *